United States Patent Office 2,983,577
Patented May 9, 1961

2,983,577

METHOD OF PRODUCING SODIUM TETRABORATE TETRAHYDRATE

Vincent Morgan, Boron, Calif., assignor to United States Borax & Chemical Corporation, Los Angeles, Calif., a corporation of Nevada No Drawing. Filed Apr. 15, 1958, Ser. No. 728,545

2 Claims. (Cl. 23—59)

This invention relates as indicated to a method for producing sodium tetraborate tetrahydrate and has more particular reference to a method for synthetically producing kernite ($Na_2B_4O_7 \cdot 4H_2O$) from water solution at atmospheric pressure.

The mineral kernite ($Na_2B_4O_7 \cdot 4H_2O$) is known to be naturally occurring, and at one time was the major borate ore used in the production of borax, boric acid, etc. However, while kernite was used to produce refined borax ($Na_2B_4O_7 \cdot 10H_2O$), refined substantially pure crystals of kernite ($Na_2B_4O_7 \cdot 4H_2O$) have never been produced.

Over the years the kernite deposits have been used less and less and the present principal borate source is now borax ($Na_2B_4O_7 \cdot 10H_2O$). With the increasing interest of supplying a slowly soluble borate material for agricultural purposes, a new interest has again been aroused in kernite. Besides the advantage of slow water solubility, kernite has the additional advantages of greater density and of only containing 4 mols of water which is quite obviously a shipping advantage over 10 mol or even 5 mol borax.

Many futile attempts have been made to synthetically produce kernite from borax at atmospheric pressure. The only known synthesis of kernite was accomplished under laboratory conditions by the use of high temperatures and pressures over long periods of time. Even with the foregoing ideal laboratory conditions the resultant product contained some 5 mol borax.

The main reason that $Na_2B_4O_7 \cdot 10H_2O$ ore is used instead of kernite ore is that kernite is so insoluble and difficult to refine. High temperature and autoclaves are necessary in the dissolution of kernite, whereas relatively simple straightforward hot water solution is all that is necessary to dissolve borax ore. Thus it would be extremely desirable if kernite could be produced synthetically at will from borax ore using the same plane equipment.

It is therefore the principal object of the present invention to provide a method for producing a substantially pure synthetic kernite ($Na_2B_4O_7 \cdot 4H_2O$) from borax ore.

A further object of this invention is to provide a method for producing kernite at atmospheric pressure.

Other objects will become apparent as the description proceeds.

To the accomplishments of the foregoing and related ends, the invention then comprises the features hereinafter fully described and particularly pointed out in the claims, the following description setting forth in detail certain illustrative embodiments of the invention, these being indicative, however, of but a few of the ways in which the principle of the invention may be employed.

Broadly stated the present invention comprises the method of synthetically producing kernite which comprises preparing an aqueous solution containing at least 28.0% by weight of $Na_2B_4O_7 \cdot 10H_2O$, heating the solution to at least 57.5° C., seeding said solution with a minor amount of kernite crystals and continuing the heating until kernite crystallizes from said solution.

Thus, contrary to the teachings of the prior art, I have found that kernite can be prepared synthetically from borax providing certain conditions are maintained. First, an aqueous solution must be used which contains at least 28.0% by weight of borax, and secondly, the temperature of the borax solution must be at a temperature of at least 57.5° C.

As stated, kernite must be crystallized from solutions containing at least 28% $Na_2B_4O_7 \cdot 10H_2O$. This means that kernite can be crystallized from a 28% solution up to and including a 100% solution of the 10 mol borax. If 10 mol borax is dissolved in its own water of hydration this solution can be used for the crystallization of kernite.

According to the process of the present invention the 4 mol hydrate of sodium tetraborate may be prepared by first forming the 5 mole hydrate and then redissolving the 5 mole hydrate in a solution saturated with respect to the 5 mol hydrate and then crystallizing out the 4 mol hydrate, or it may be crystallized directly from aqueous solution without having the 5 mol present at any time.

So that the present invention may be more clearly understood, the following examples are offered by way of illustration.

I

A 60% borax solution was made by heating 300 grams of $Na_2B_4O_7 \cdot 10H_2O$ with 200 ml. of $H_2O$ in a flask. The flask was fitted with a condenser and heated for about 18 hours at 100° C.

After about 18 hours the 5 mol hydrate, $Na_2B_4O_7 \cdot 5H_2O$ crystallized from solution. The mixture was then seeded with about 0.10 gram of natural kernite and the heating continued.

At the end of about 62 hours' total heating time a large crystalline mass was formed at the bottom of the flask. The crystals were filtered, washed with hot water and isopropyl alcohol, and then air-dried.

The crystals were chemically, microscopically analyzed, and additionally an X-ray powder pattern was made. The analysis provided conclusively that the product of the aforegoing example was substantially pure crystals of kernite.

II 300 grams of $Na_2B_4O_7 \cdot 10H_2O$ was put into a flask with 200 ml. of $H_2O$. The flask was fitted with a condenser and stirrer which turned at about 170 r.p.m. When all the borax was put in solution the temperature was maintained at about 84° C.

After 6 hours the solution was seeded with about 0.05 gram of natural kernite.

At about 23 hours' total elapsed time the solid phase consisted almost entirely of 5 mol hydrate. After 48 hours' total elapsed time the solid phase was examined optically and found to be substantially pure kernite.

A chemical analysis revealed the following results:

|  | Percent found in Sample | Theoretical 4 mol |
|---|---|---|
| $B_2O_3$ | 50.84 | 50.96 |
| $Na_2O$ | 22.67 | 22.68 |

III

A solution of 10 mol borax in water was prepared which assayed 55% borax. The solution was seeded with about 0.10 gram of natural kernite and the flask was equipped with a condenser and stirrer. The flask was heated and maintained at a temperature of 91° C. Samples were studied at 18 hours and 25 hours' total elapsed time. No crystals of 5 mol borax were found in the solution. After 67 hours the solution was filtered and the crystals washed and dried.

A chemical analysis gave the following results:

|       | Percent found in Sample | Theoretical 4 mol |
|-------|-------------------------|-------------------|
| $B_2O_3$ | 50.94                | 50.96             |
| $Na_2O$  | 22.70                | 22.68             |

The foregoing experiments illustrate that the 4 mol hydrate of sodium tetraborate may be prepared directly from the 10 mol borax or it can be prepared from the 10 mol borax by first going through the 5 mol borax stage.

IV

A 300 gram portion of slightly damp 10 mol borax containing 96.2% $Na_2B_4O_7 \cdot 10H_2O$ was heated in a flask (without the addition of water) fitted with a stirrer and a condenser. The temperature was maintained at approximately 98° C. The mixture was seeded with a minor amount (0.10 gram) of natural kernite, and heating continued while stirring.

After 24 hours the contents of the flask were examined and found to consist of a mixture of the 4 and 5 mol hydrates, and was of a pasty consistency. Heating was continued until a total of 50 hours had elapsed, when the contents of the flask were removed, washed with hot water and isopropyl alcohol, and dried at room temperature. Microscopic (optical) examination showed the recovered material to be substantially pure kernite. An analysis of the recovered material is given below:

|       | Percent found in Sample | Theoretical 4 mol |
|-------|-------------------------|-------------------|
| $B_2O_3$ | 50.84                | 50.96             |
| $Na_2O$  | 22.77                | 22.68             |

Other modes of applying the principle of the invention may be employed, change being made as regards the details described, provided the features stated in any of the following claims or the equivalent of such be employed.

I, therefore, particularly point out and distinctly claim as my invention:

1. The method of synthetically producing kernite which comprises preparing an aqueous solution containing at least 28.0% by weight of $Na_2B_4O_7 \cdot 10H_2O$, heating the solution under atmospheric pressure in a temperature range of from 57.5° C. to about 100° C., seeding said solution with a minor amount of kernite crystals and continuing the heating until conversion of the $$Na_2B_4O_7 \cdot 10H_2O$$

to the tetrahydrate form is substantially complete and the desired synthetic kernite crystallizes out of said solution.

2. The method of synthetically producing kernite which comprises preparing an aqueous solution containing at least 28% by weight of $Na_2B_4O_7 \cdot 10H_2O$, heating said solution under atmospheric pressure in a temperature range of from 57.5° C. to about 100° C. until $$Na_2B_4O_7 \cdot 5H_2O$$

crystallizes out of solution, seeding the mixture with a minor amount of $Na_2B_4O_7 \cdot 4H_2O$, and continuing said heating until the $Na_2B_4O_7 \cdot 5H_2O$ redissolves and $$Na_2B_4O_7 \cdot 4H_2O$$

crystallizes out of solution.

References Cited in the file of this patent

UNITED STATES PATENTS

| 2,032,388 | Allen | Mar. 3, 1936 |
| 2,738,254 | Suhr  | Mar. 13, 1956 |

OTHER REFERENCES

"Thorpe's Dictionary of Applied Chemistry," vol. 2, 4th ed., 1938, page 49, Longmans, Green and Co., New York, N.Y.

"Crystallization of Borax," by Donald E. Garrett and Gerhard P. Rosenbaum, Ind. and Eng. Chem., November 1958, vol. 50, No. 11, pages 1681–1684.